United States Patent
Yamashita et al.

(10) Patent No.: US 9,164,823 B2
(45) Date of Patent: Oct. 20, 2015

(54) RESETTING A PERIPHERAL DRIVER AND PROHIBITING WRITING INTO A REGISTER RETAINING DATA TO BE WRITTEN INTO A PERIPHERAL ON EXCEEDING A PREDETERMINED TIME PERIOD

(71) Applicant: FUJITSU LIMITED, Kawasaki-shi, Kanagawa (JP)

(72) Inventors: Koichiro Yamashita, Hachioji (JP); Hiromasa Yamauchi, Kawasaki (JP); Takahisa Suzuki, Kawasaki (JP); Koji Kurihara, Kawasaki (JP); Fumihiko Hayakawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 13/894,022

(22) Filed: May 14, 2013

(65) Prior Publication Data
US 2013/0254598 A1    Sep. 26, 2013

Related U.S. Application Data

(63) Continuation of application No. PCT/JP2010/070319, filed on Nov. 15, 2010.

(51) Int. Cl.
  *G06F 11/00* (2006.01)
  *G06F 11/07* (2006.01)
  *G06F 11/30* (2006.01)
  *G06F 11/34* (2006.01)

(52) U.S. Cl.
  CPC ........ *G06F 11/0757* (2013.01); *G06F 11/0724* (2013.01); *G06F 11/3041* (2013.01); *G06F 11/3419* (2013.01); *G06F 11/3485* (2013.01)

(58) Field of Classification Search
  None
  See application file for complete search history.

(56) References Cited

U.S. PATENT DOCUMENTS

| | | | |
|---|---|---|---|
| 2004/0123188 A1* | 6/2004 | Srinivasan et al. | 714/44 |
| 2006/0161821 A1* | 7/2006 | Oshins et al. | 714/52 |
| 2010/0115193 A1* | 5/2010 | Manus et al. | 711/103 |
| 2010/0262861 A1* | 10/2010 | Mazina | 714/6 |
| 2010/0306789 A1* | 12/2010 | Sahashi | 719/327 |

FOREIGN PATENT DOCUMENTS

| | | |
|---|---|---|
| JP | 55-108026 A | 8/1980 |
| JP | 04-273561 A | 9/1992 |
| JP | 06-208536 A | 7/1994 |
| JP | 2001-109646 A | 4/2001 |
| JP | 2007-507034 A | 3/2007 |
| JP | 2008-269335 A | 11/2008 |
| WO | WO 2005/031575 A2 | 4/2005 |

OTHER PUBLICATIONS

"Timeout Detection and Recovery of GPUs through WDDM", updated Aprili 27, 2009, Microsoft [http://msdn.microsoft.com/en-us/windows/hardware/gg4878368.aspx] via archive.org.*
Chinese Office Action issued Feb. 5, 2015; Chinese Application No. 201080070131.7, with English Translation.

* cited by examiner

*Primary Examiner* — Gabriel Chu
(74) *Attorney, Agent, or Firm* — Arent Fox LLP

(57) ABSTRACT

An access method is executed by a multi-core processor system. The access method includes activating a driver that corresponds to a first CPU, based on a start of execution of a first application; starting measurement of an access time period, based on access of a peripheral device; outputting, when the access time period exceeds a predetermined time period, a detection signal to reset the driver; and prohibiting, when the access time period exceeds a predetermined time period, writing into a register retaining data to be written into the peripheral device from the first CPU.

9 Claims, 9 Drawing Sheets

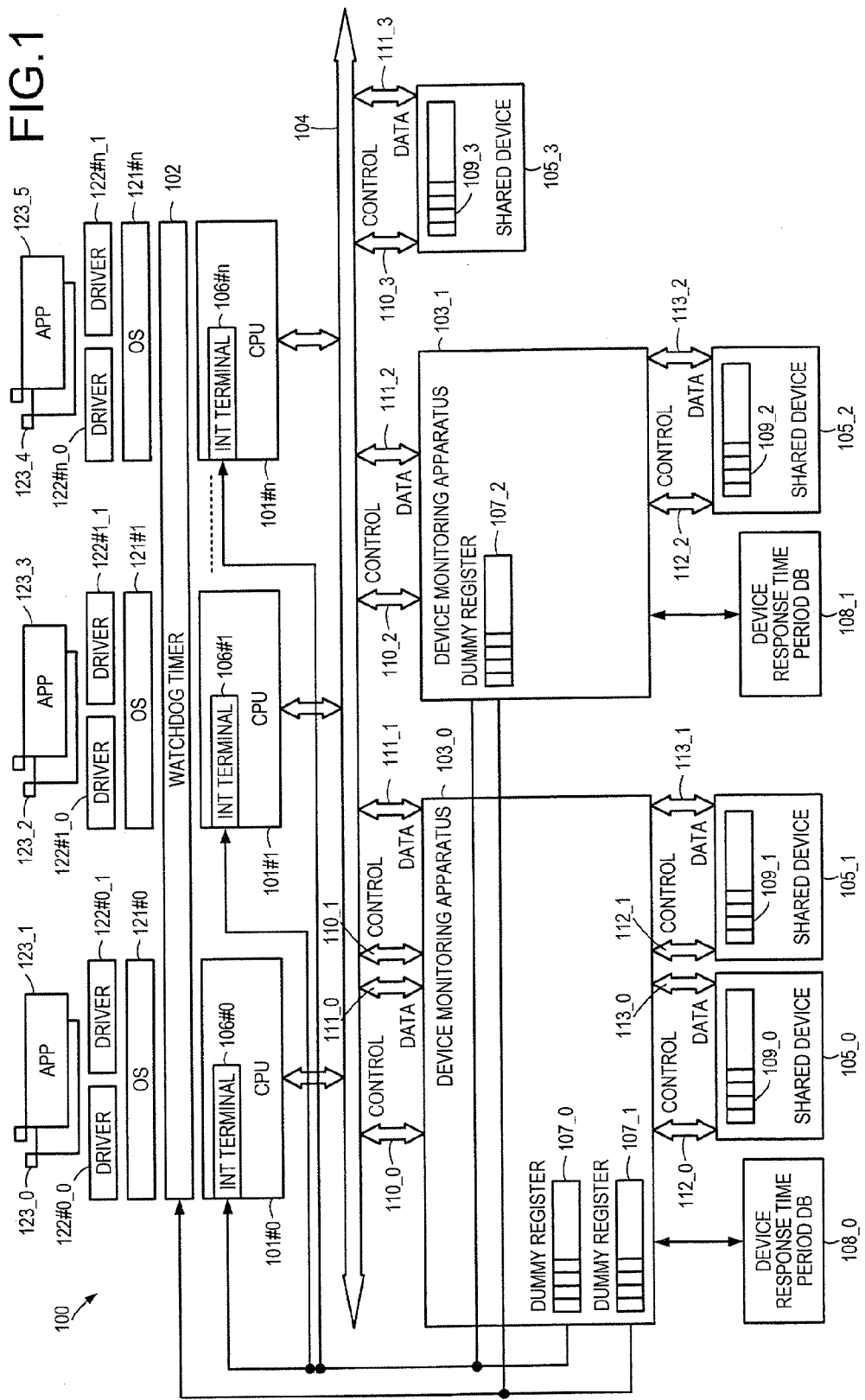

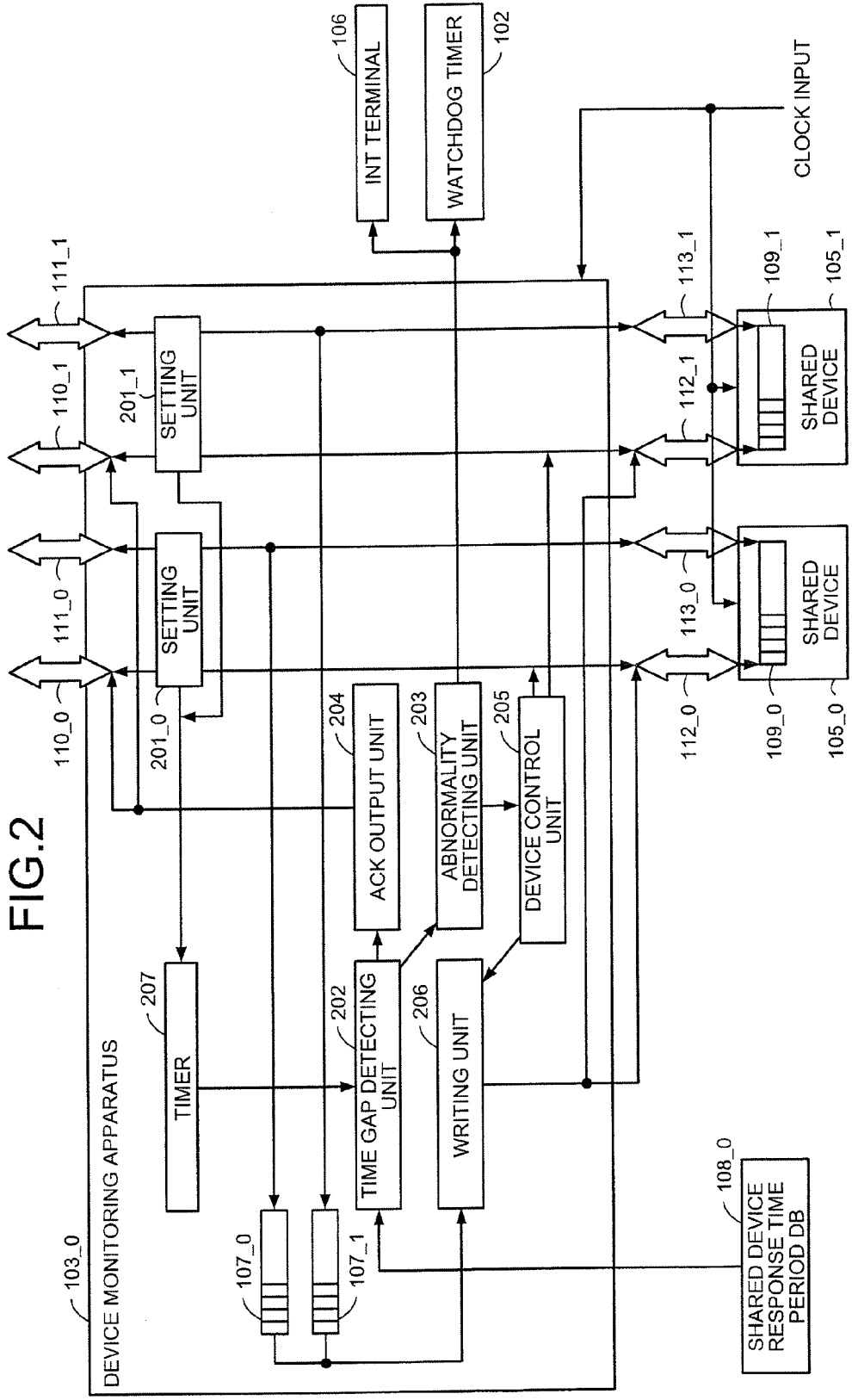

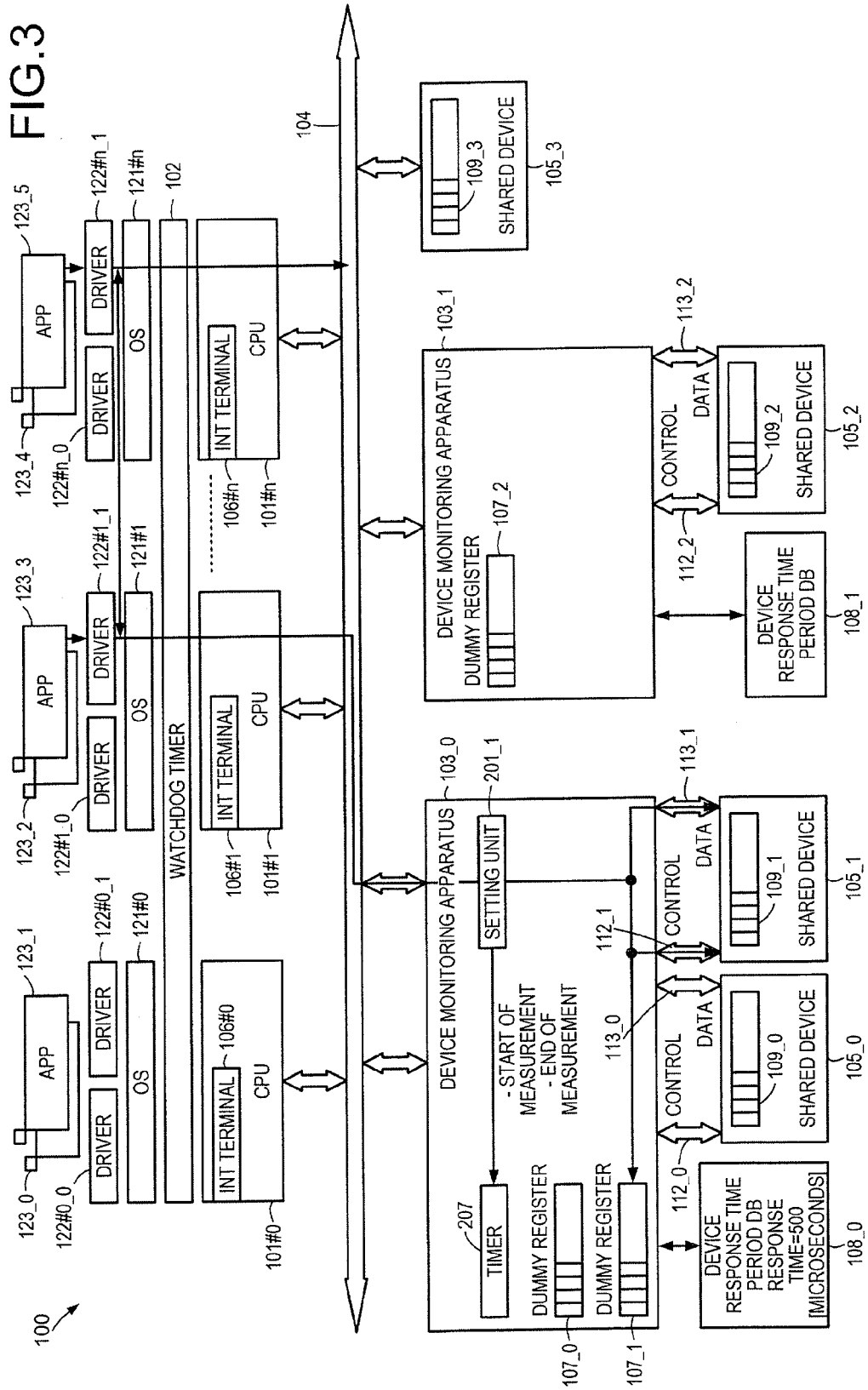

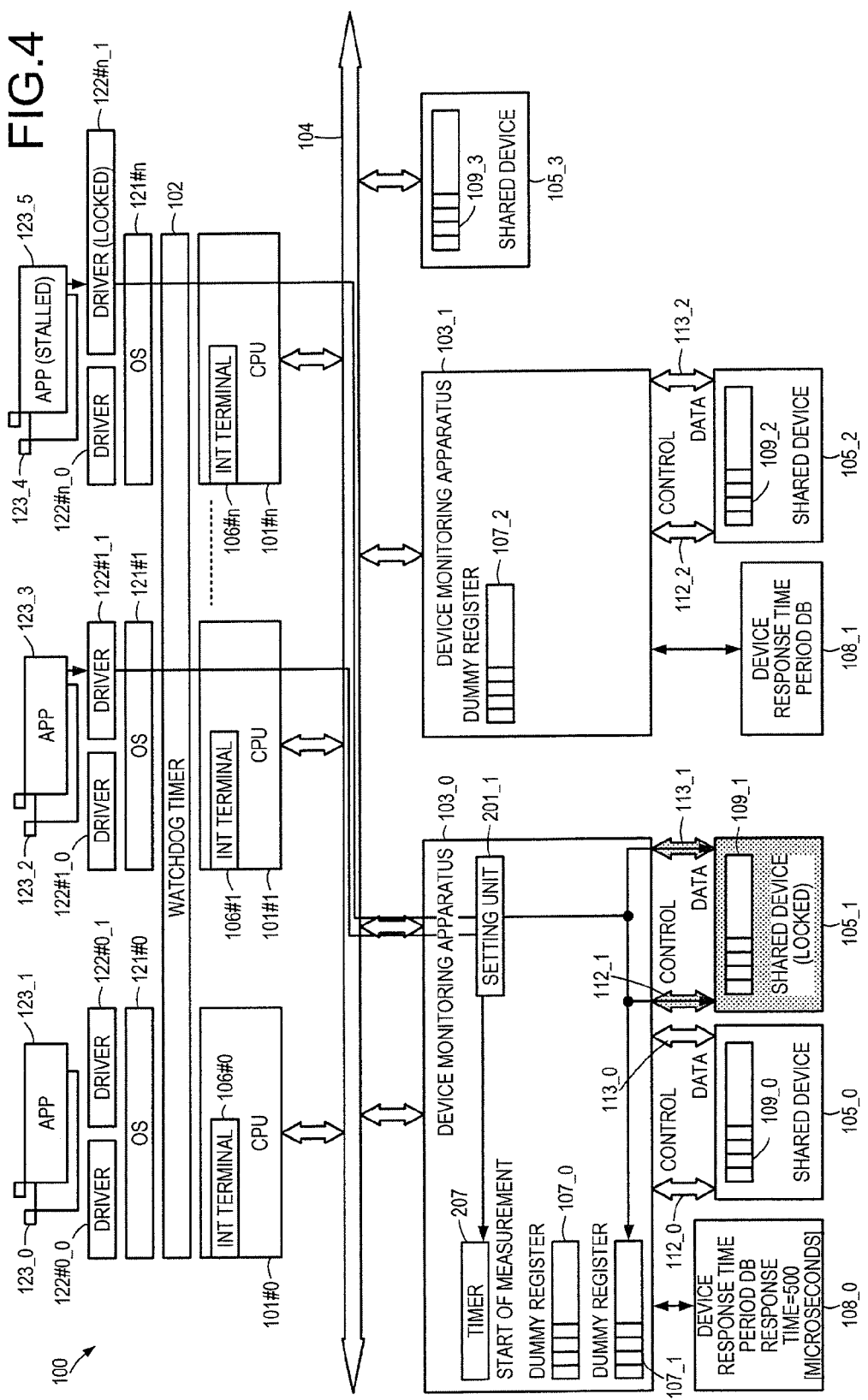

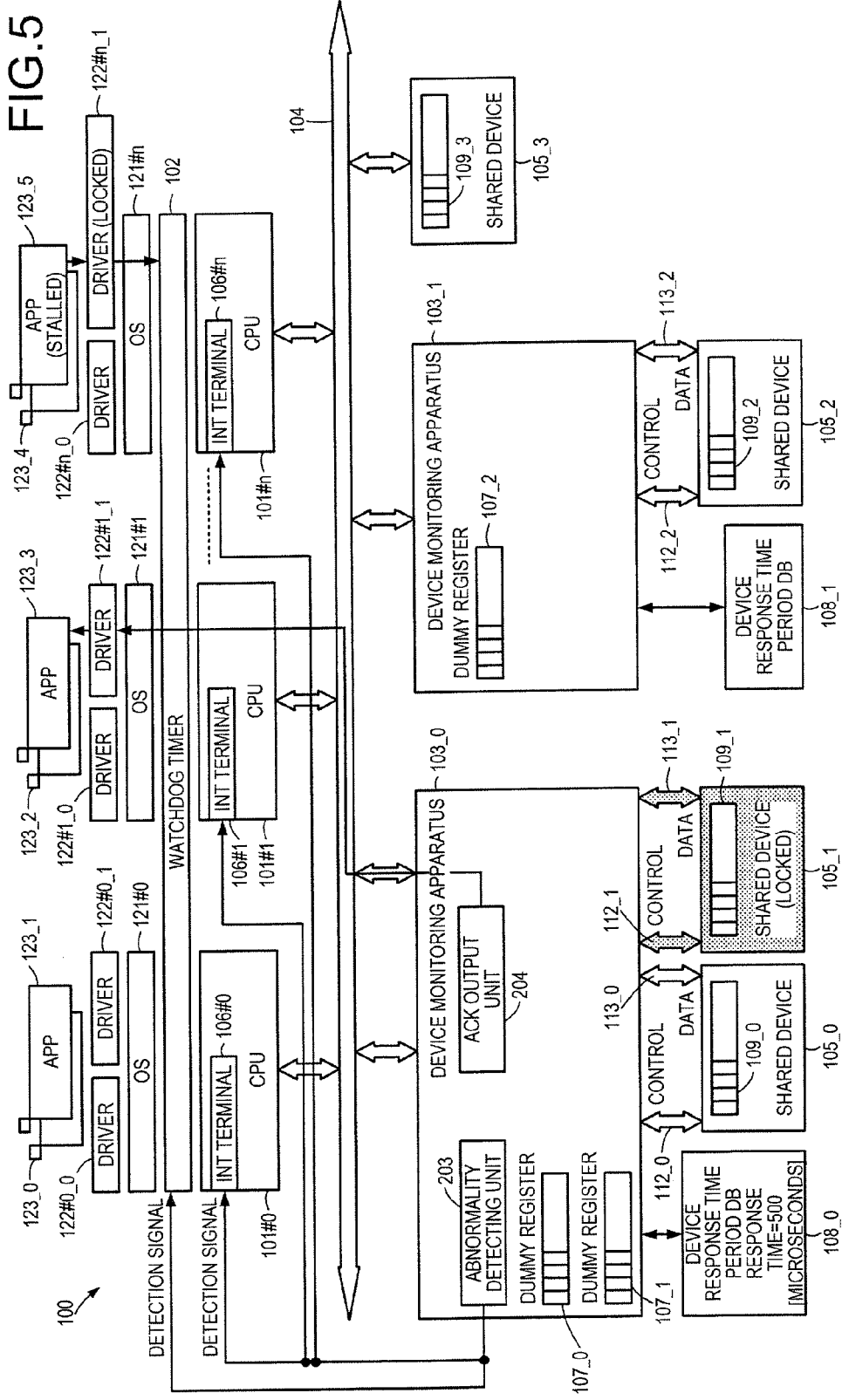

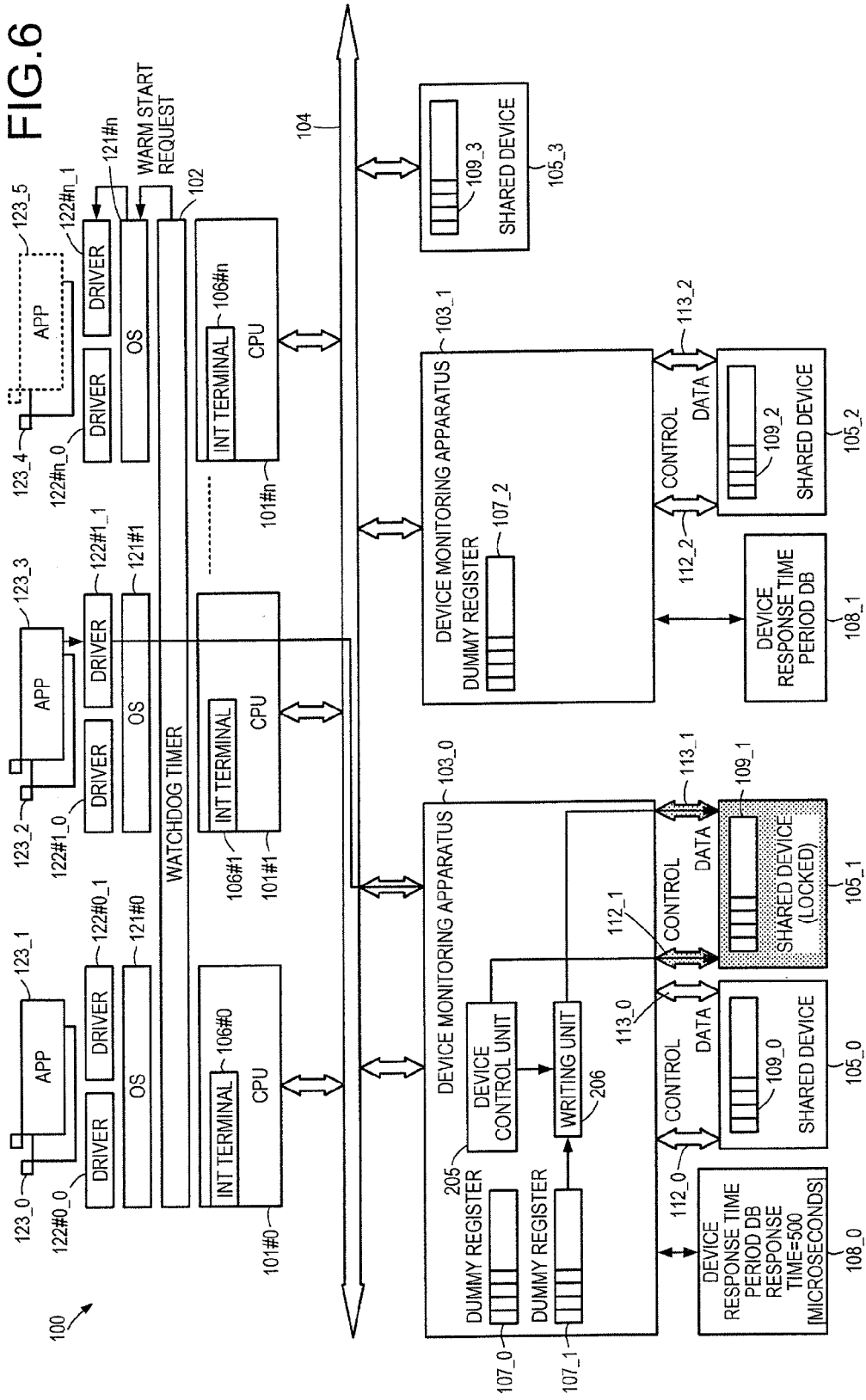

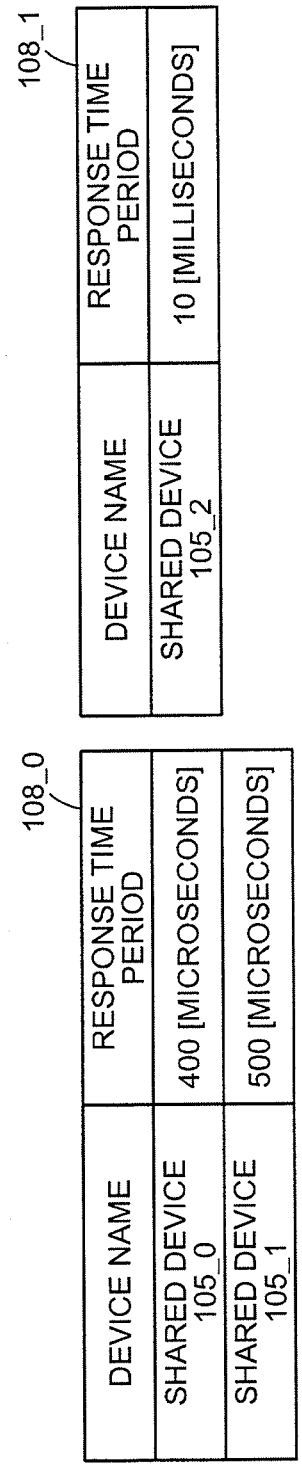

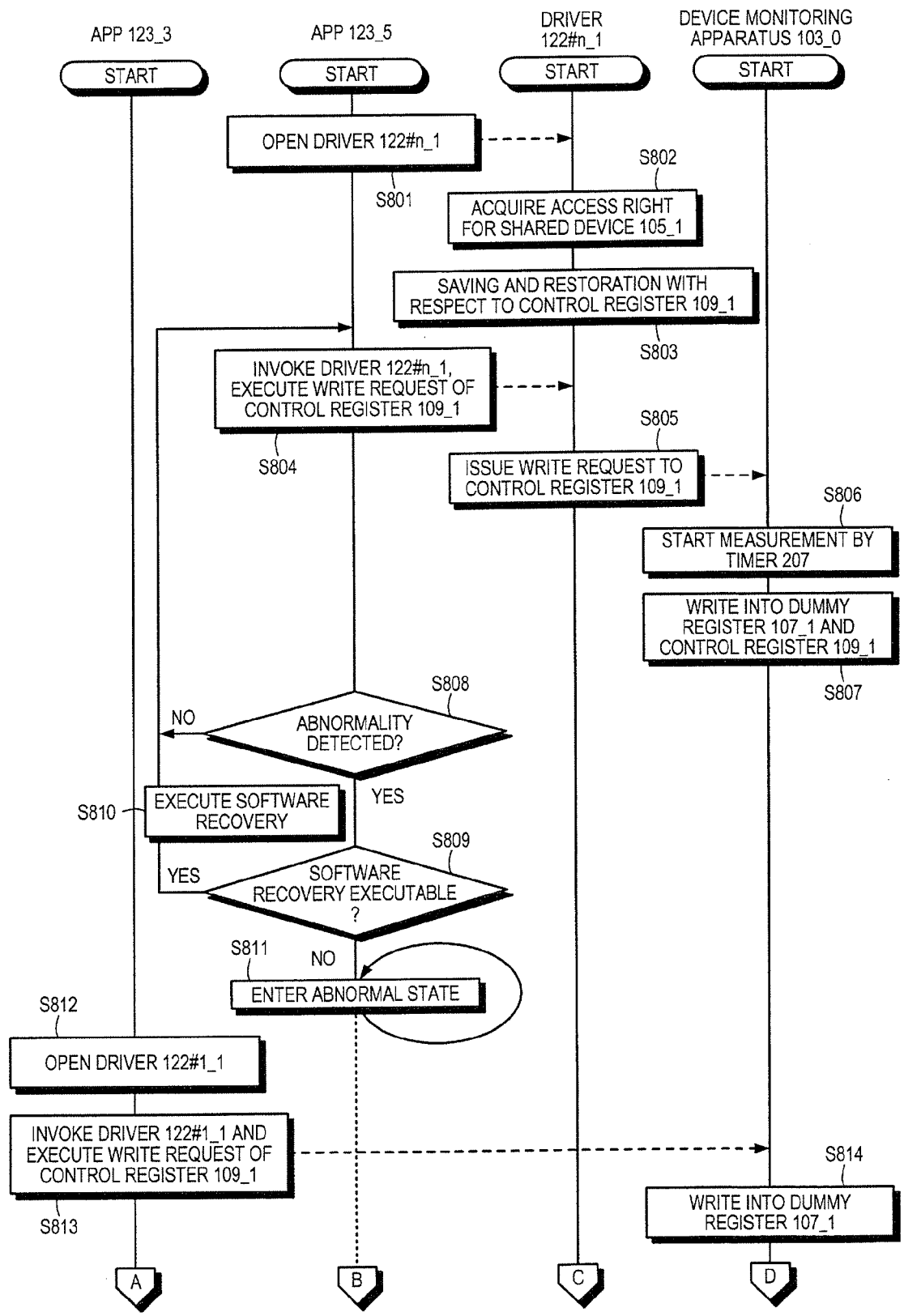

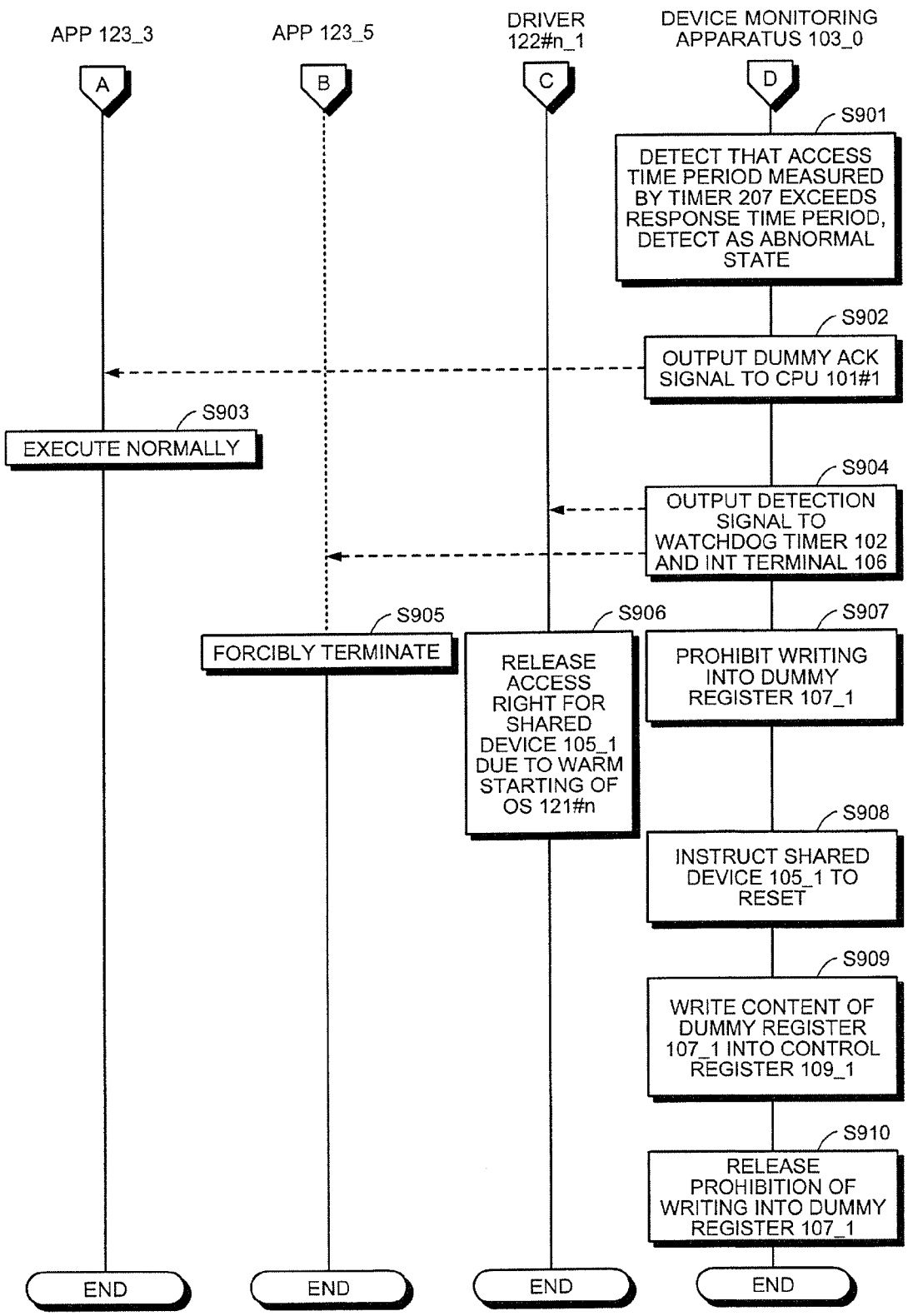

RESETTING A PERIPHERAL DRIVER AND PROHIBITING WRITING INTO A REGISTER RETAINING DATA TO BE WRITTEN INTO A PERIPHERAL ON EXCEEDING A PREDETERMINED TIME PERIOD

CROSS REFERENCE TO RELATED APPLICATIONS

This application is a continuation application of International Application PCT/JP2010/070319, filed on Nov. 15, 2010 and designating the U.S., the entire contents of which are incorporated herein by reference.

FIELD

The embodiment discussed herein is related to an access method of accessing a device that is to be monitored and a multi-core processor system.

BACKGROUND

Conventionally, apparatuses monitor devices that are internally and/or externally connected to an information processing apparatus, such as a watchdog timer and a diagnosis apparatus. Techniques are also present to periodically check the devices and detect abnormalities of the devices by using these apparatuses. According to one technique, a backup system is managed separately from a main system and, the main system and the backup system are switched when an abnormality of a device is detected in the main system.

A technique for the occurrence of an abnormality is disclosed. According to the technique, an additional apparatus of an input and output apparatus is provided of a multi-core processor system that includes plural cores, whereby the number of a started-up central processing unit (CPU) is recorded (see, for example, Japanese Laid-Open Patent Publication No. S55-108026). A technique is disclosed for restoration executed after the occurrence of an abnormality. According to the technique, in controlling a co-processor that aids a CPU, hanging up is detected and the co-processor that hangs up is reset (see, for example, Published Japanese-Translation of PCT Application, Publication No. 2007-507034).

A technique is disclosed to reduce a response time period between devices. According to the technique, a control apparatus is disposed in a shared system of plural CPUs and plural inputs/outputs (I/Os); when a start-up I/O is operating, a control signal is recorded; and after the completion of the operation, a dummy I/O is transmitted (see, for example, Japanese Laid-Open Patent Publication No. H6-208536).

Of the above conventional techniques, the techniques according to Japanese Laid-Open Patent Publication No. S55-108026 and Published Japanese-Translation of PCT Application, Publication No. 2007-507034 are each directed to abnormalities caused by faults of hardware. However, according to the techniques, faults caused by software access of devices are determined as normal states and therefore, a problem arises in that abnormal states are overlooked.

In a multi-core processor system, if an abnormal state is overlooked, the state occurs where application software (hereinafter, referred to as "app") having a problem stalls retaining an access right for a shared device and another app can not acquire the access right for the shared device. As a result, a problem arises in that the other app unable to acquire the access right also stalls, that is, the consecutive stalls occur. When consecutive stalls occur, another problem arises in that, among the apps that stall, the app that is the software having a problem has to be identified.

SUMMARY

According to an aspect of an embodiment, an access method is executed by a multi-core processor system. The access method includes activating a driver that corresponds to a first CPU, based on a start of execution of a first application; starting measurement of an access time period, based on access of a peripheral device; outputting, when the access time period exceeds a predetermined time period, a detection signal to reset the driver; and prohibiting, when the access time period exceeds a predetermined time period, writing into a register retaining data to be written into the peripheral device from the first CPU.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of hardware and software of a multi-core processor system 100 according to an embodiment;

FIG. 2 is a block diagram of a functional configuration of a device monitoring apparatus 103;

FIG. 3 is an explanatory diagram of operations executed during normal operation of the multi-core processor system 100;

FIG. 4 is an explanatory diagram of operations executed before an abnormal state of the multi-core processor system 100 occurs;

FIG. 5 is an explanatory diagram of operations executed after the abnormal state of the multi-core processor system 100 occurs;

FIG. 6 is an explanatory diagram of an operation of the multi-core processor system 100 for restoration from an abnormal state;

FIG. 7 is an explanatory diagram of an example of the storage contents of a device response time period DB 108;

FIG. 8 is a flowchart of processes executed for detection of an abnormal state of the multi-core processor system 100; and FIG. 9 is a flowchart of a process for restoration from an abnormal state of the multi-core processor system 100.

DESCRIPTION OF EMBODIMENTS

Preferred embodiments of the disclosed access method and multi-core processor system will be described in detail with reference to the accompanying drawings.

FIG. 1 is a block diagram of hardware and software of a multi-core processor system 100 according to an embodiment. In FIG. 1, the multi-core processor system 100 includes CPUs 101#0 to 101#n, a watchdog timer 102, and device monitoring apparatuses 103_0 and 103_1, respectively connected by a bus 104. It is assumed that the multi-core processor system 100 according to the embodiment is a small terminal apparatus such as a mobile telephone. Although not depicted in FIG. 1, the bus 104 is connected to a storage device such as a read-only memory (ROM), a random access memory (RAM), or a flash ROM.

The multi-core processor system 100 also includes shared devices 105_0 to 105_3. The shared devices 105_0 and 105_1 are connected to the bus 104 through the device monitoring apparatus 103_0. The shared device 105_2 is connected to the bus 104 through the device monitoring apparatus 103_1. The shared device 105_3 is directly connected to the bus 104.

The CPUs 101#0 to 101#n respectively include interrupt (INT) terminals 106#0 to 106#n that are interrupt input terminals. "n" is an integer that is greater than or equal to zero. The suffix symbol "#n" is a symbol for an n-th CPU. For example, the "INT terminal 106#n" represents being an interrupt input terminal that is included in the CPU 101#n.

The device monitoring apparatuses 103_0 and 103_1 include dummy registers 107_0, 107_1 and 107_2, and can respectively access device response time period DBs 108_0 and 108_1. The shared devices 105_0 to 105_3 respectively include control registers 109_0 to 109_3 that control operations of the shared devices 105.

The CPUs 101#0 to 101#n supervise the control of the entire multi-core processor system 100. The multi-core processor system 100 is a multi-core processor system that includes plural cores. The multi-core processor system 100 may be a single-core processor system having a singular core. The CPUs 101#0 to 101#n each include cache memory and a register.

The watchdog timer 102 is a diagnosing circuit that monitors whether the operation of one of the CPUs 101#0 to 101#n, the shared devices 105_0 to 105_3, etc., stops. For example, if one of the CPUs 101, the shared devices 105, etc. receives excess voltage and the operation thereof stops, the watchdog timer 102 detects an abnormality thereof and receives from the device monitoring apparatus 103, notification concerning the abnormal state of one of the shared devices 105.

The device monitoring apparatuses 103_0 and 103_1 are apparatuses that monitor the shared devices 105_0 to 105_3. The device monitoring apparatus 103 sets the priority of the shared device 105 to be monitored. One device monitoring apparatus 103 may alone monitor a shared device 105 whose priority is high, and another one device monitoring apparatus 103 may collectively monitor a group of the other shared devices 105.

For example, a stopped state of the shared device 105_2 is not desirable and therefore, the priority of the monitoring of the shared device 105_2 is high. Therefore, the multi-core processor system 100 is designed such that the device monitoring apparatus 103_1 alone monitors the shared device 105_2. Even if the shared device 105_3 is in a stopped state, the stopped state does not affect the operation of the multi-core processor system 100 and therefore, the priority of monitoring of the shared device 105_3 is low.

Therefore, the multi-core processor system 100 is designed such that the device monitoring apparatuses 103 do not monitor the shared device 105_3. The shared devices 105_0 and 105_1 are defined as shared devices 105 whose control is relatively slow, and the priority of monitoring thereof is set to be intermediate. The multi-core processor system 100 is designed such that the device monitoring apparatus 103_0 collectively monitors the shared devices 105_0 and 105_1.

The device monitoring apparatuses 103 are connected to the bus 104 and the shared devices 105 to be monitored, and include the same number of control lines 110 and 112, and data lines 111 and 113 as the number of shared devices 105 to be monitored.

For example, the device monitoring apparatus 103_0 includes the control line 110_0 and the data line 111_0 on the side of the bus 104, and the control line 112_0 and the data line 113_0 on the side of the shared device 105_0, each corresponding to the shared device 105_0 to be a first shared device to be monitored. The device monitoring apparatus 103_0 includes the control line 110_1 and the data line 111_1 on the side of the bus 104 and the control line 112_1 and the data line 113_1 on the side of the shared device 105_1, each corresponding to the shared device 105_1 to be a second shared device to be monitored. Functions of the device monitoring apparatuses 103 will be described later with reference to FIG. 2.

The shared devices 105_0 and 105_3 are peripheral devices used by the CPUs 101#0 to 101#3. For example, the shared devices 105_0 and 105_3 are each a communication unit, a camera device, an audio device, a display, a keyboard, etc. A specific example of the shared device 105_2 whose priority of monitoring by the device monitoring apparatus 103 is set to be high can be a communication unit, etc. A specific example of the shared devices 105_0 and 105_1 whose priorities of monitoring by the device monitoring apparatuses 103 are set to be intermediate can be a camera device, an audio device, etc.

The INT terminals 106#0 to 106#n are interrupt input terminals that receive interrupt signals from the device monitoring apparatuses 103. Although not depicted in FIG. 1, the INT terminals 106#0 to 106#n also receive interrupt signals from the shared devices 105, etc.

The dummy registers 107_0 to 107_2 retain information to be written into the control registers 109_0 to 109_2 by the CPUs 101#0 to 101#n. For example, the dummy register 107_0 retains the information to be written into the control register 109_0. The dummy registers 107 each may retain information to be written that corresponds to any one bit of the control registers 109 or may retain information to be written that corresponds to a portion of the bits of the control registers 109.

The shared devices 105 each have registers other than the control registers 109, and the other registers may be retained by the dummy registers 107. The other registers can each be, for example, a status register that stores the operation states of the shared devices 105, etc.

The device response time period DBs 108_0 and 108_1 are storage areas that store the response time periods consumed when information is written into the control registers 109 of the shared devices 105. The contents of each of the device response time period DBs 108_0 and 108_1 may be in the RAM, the ROM, or the flash ROM that is connected to the bus 104, or may be in a storage area that is in the device monitoring apparatus 103.

The multi-core processor system 100 includes operating systems (OSs) 121#0 to 121#n, drivers 122#0_0 to 122#n_1, and apps 123_0 to 123_5, as software of the multi-core processor system 100.

The OSs 121#0 to 121#n are software that controls the CPUs 101#0 to 101#n. For example, the OS 121#0 includes software such as a scheduler that determines an app to be assigned to the CPU 101#0 among the apps 123_0 and 123_1; a dispatcher that assigns the determined app to the CPU 101#0; etc. The OSs 121#0 to 121#n execute exclusive control processes for the shared devices 105.

The drivers 122#0_0 to 122#n_1 are functions provided by the OSs 121#0 to 121#n and are software that accesses the shared devices 105. The drivers 122#0_0 to 122#n_1 are activated by an invocation from the apps 123_0 to 123_5 and access the shared device 105 corresponding thereto.

In FIG. 1, the drivers 122#0_0, 122#1_0, . . . , 122#n_0 are software that accesses the shared device 105_0. Similarly, the drivers 122#0_1, 122#1_1, . . . , 122#n_1 are software that accesses the shared device 105_1. Although not depicted in FIG. 1, the drivers 122 for the shared devices 105_2 and 105_3 are also present in the OSs 121#0 to 121#n.

In this manner, the CPUs 101#0 to 101#n each invoke the corresponding driver 122 and thereby, can each access one shared device 105. To avoid occurrence of any fault due to simultaneous access, the multi-core processor system 100 is designed such that exclusive control process prevents access contention from occurring with respect to a shared device 105.

The apps 123_0 to 123_5 are software that provides services for users of the multi-core processor system 100. For example, the apps 123_0 to 123_5 are a music reproduction app, a game app, a camera app, etc. The apps 123_0 to 123_5 invoke the drivers 122#00 to 122#n_1 and thereby, operate the shared devices 105_0 to 105_3. For example, it is assumed that the app 123_3 is a music reproduction app and the shared device 105_1 is an audio device. In this case, the app 123_0 invokes the driver 122#1_1 and operates the audio device and thereby, realizes reproduction of music.

FIG. 2 is a block diagram of a functional configuration of the device monitoring apparatus 103. The device monitoring apparatus 103 includes setting units 201_0 and 201_1, a time gap detecting unit 202, an abnormality detecting unit 203, an ACK output unit 204, a device control unit 205, a writing unit 206, and a timer 207. The device monitoring apparatus 103 and the shared devices 105 each receive an external clock input.

The setting units 201_0 and 201_1 each have a function of setting the start of measurement of an access time period, in the timer 207 based on access of the shared device 105 by a first CPU, among the CPUs 101#1 to 101#n. The "access time period" is a time period from the time of access of the shared device 105 (the starting time), until the time at which a response signal to the access is generated from the shared device 105 (the ending time).

For example, the CPU 101#n detects a write request for the shared device 105_1 and the setting unit 201_1 sets in the timer 207, the start of the measurement of the access time period. When a response signal to the access is output from the shared device 105, the setting units 201_0 and 201_1 may stop the measurement of the access time period. The "response signal" is an acknowledgement (ACK) signal. The setting unit 201_0 detects access of the shared device 105_0 and the setting unit 201_1 detects access of the shared device 105_1. The set information is stored to the storage area of the device monitoring apparatus 103, a storage area of a setting register of the timer 207, etc.

The time gap detecting unit 202 has a function of detecting that the access time period exceeds a predetermined time period. The "predetermined time period" is a response time period to be a part of the specification of the shared device 105 and is stored in the device response time period DB 108. For example, the time gap detecting unit 202 detects that the access time period starting at the time of the write request for the shared device 105_1 as the starting time exceeds the response time period of 500 [microsecond] of the shared device 105_1. The result of the detection is stored to the storage area of the device monitoring apparatus 103.

The abnormality detecting unit 203 has a function of outputting a detection signal when the time gap detecting unit 202 detects that the access time period exceeds the predetermined time period. The detection signal can be a detection signal that indicates an abnormal state of the watchdog timer 102 and a detection signal that indicates an abnormal state of the INT terminal 106. For example, the abnormality detecting unit 203 outputs a detection signal for the watchdog timer 102 and the INT terminal 106 when the access time period exceeds the response time period of 500 [microsecond] to be a part of the specification of the shared device 105_1.

The ACK output unit 204 has a function of outputting a dummy ACK signal to a second CPU that accesses the shared device 105 when the first CPU is accessing the shared device 105. The dummy ACK signal is a signal whose content is same as the content of the ACK signal. For example, the ACK output unit 204 outputs the dummy ACK signal to the CPU 101#1 that accesses the shared device 105_1 when the CPU 101#n is accessing the shared device 105_1. Information concerning the output of the dummy ACK signal may be stored to the storage area of the device monitoring apparatus 103.

The device control unit 205 has a function of instructing the shared device 105 from which no response signal to the access is issued to the first CPU, to reset. For example, the device control unit 205 instructs the shared device 105_1 from which no response signal to the access is issued to the CPU 101#n, to reset. Information concerning the instruction of the resetting is stored to the storage area of the device monitoring apparatus 103.

The writing unit 206 has a function of writing the content of the dummy register 107 into the control register 109 after the device control unit 205 causes the shared device 105 to complete resetting. For example, after the shared device 105_1 completes resetting, the writing unit 206 writes the content of the dummy register 107_1 into the control register 109_1. Information concerning the writing may be stored to the storage area of the device monitoring apparatus 103.

The timer 207 has a function of measuring the access time period. For example, the timer 207 measures from the access starting time, a clock that is input from an external source and thereby, measures the access time period. The timer 207 is caused to start measurement and to stop measurement by the setting units 201_0 and 201_1.

A series of operations will be described with reference to FIGS. 3 to 6. The operations are executed when the multi-core processor system 100 enters an abnormal state from a normal operation state and recovers from the abnormal state, using a function of the device monitoring apparatus 103. It is assumed in FIGS. 3 to 6 that the app 123_3 is a music reproduction app, that the app 123_5 is a game app that produces sounds, and that the shared device 105_1 is an audio device.

FIG. 3 is an explanatory diagram of operations executed during normal operation of the multi-core processor system 100. When the multi-core processor system 100 operates normally, the OSs 121#0 to 121#n coordinate and switch the drivers 122#0_0 to 122#n_1 for the operation of the multi-core processor system 100.

For example, the app 123_3 executes decoding and DA conversion of the music data; writes the result of the conversion into the control register 109_1 through the driver 122#1_1; and thereby, causes the shared device 105_1 to reproduce music. The app 123_5 writes the music data into the control register 109_1 through the driver 122#n_1 and thereby, causes the shared device 105_1 to reproduce music. This is a state where the user listens to the sound formed by mixing the sound data output from the app 123_5 and the music data output from the app 123_3.

When the device monitoring apparatus 103 during the normal operation receives a write request from, for example, the driver 122#1_1, the device monitoring apparatus 103 writes into the control register 109_1, the data that is to be written and also writes the data into the corresponding dummy register 107_1. When the setting unit 201_1 receives the write request, the setting unit 201_1 sets the start of the measurement of the access time period by the timer 207 to the time at which a response signal to the write request is issued.

The multi-core processor system 100 that operates normally is depicted in FIG. 3 and therefore, the shared device 105_1 transmits the response signal to the write request, to the CPU 101#1 within the response time period=500 [microsecond] that is a part of the specification. When an ACK signal that is a response signal is issued from the shared device 105_1, the setting unit 201_1 sets termination of the measurement of the access time period by the timer 207.

FIG. 4 is an explanatory diagram of operations executed before an abnormal state of the multi-core processor system 100 occurs. The multi-core processor system 100 depicted in FIG. 4 depicts a state where the app 123_5 stalls due to a fault. The fault can be, for example, a case where the app 123_5 writes an invalid value into the shared device 105_1 through the driver 122#n_1.

In this case, the app 123_5 may stall retaining the access right for the shared device 105_1, which is a shared resource of the multi-core processor system 100. In the state depicted in FIG. 4, the shared device 105_1 does not have any fault and therefore, the watchdog timer 102 can not detect the abnormal state. The driver 122#n_1 is kept locked by the app 123_5.

In a case where the multi-core processor system 100 is a single-core processor system, the OS 121 also stalls when the app 123_5 stalls. The multi-core processor 100 including plural cores can minimize the affect of the stalling by causing an independent OS to operate for each of the CPUs 101. However, when the app 123_3 on the CPU 101#1 attempts to access the shared device 105_1, a state is established where a response signal is not returned or access can not be made.

The multi-core processor system 100 according to the embodiment prevents the above state where the response signal is not returned or where the access can not be made. The setting unit 201_1 first sets the start of the measurement by the timer 207 when the app 123_5 executes the writing.

FIG. 5 is an explanatory diagram of operations executed after the abnormal state of the multi-core processor system 100 occurs. The multi-core processor system 100 in FIG. 5 is depicted for a case where the elapsed time period of the timer 207 that starts the measurement in FIG. 4 exceeds the response time period=500 [microseconds] set in the device response time period DB 108. For example, this is a state where the app 123_5 writes the sound data into a sound data first in, first out (FIFO) and sets a flag that indicates the completion of the data setting, in the control register 109_1, in the state indicated by the multi-core processor system 100 in FIG. 4. In this state, a case is assumed where it is determined as a part of the specification of the shared device 105_1 that the shared device 105_1 issues an ACK signal that indicates completion of the reception, in 500 [microseconds] from the time of the setting of the flag.

When the time gap detecting unit 202 detects that the time period elapsing from the time of the write request exceeds 500 [microseconds], the abnormality detecting unit 203 outputs a detection signal indicating the abnormal state to the watchdog timer 102. The abnormality detecting unit 203 also sends to the INT terminal 106, the detection signal that indicates the abnormal state of the shared device 105_1. The CPU 101 receives the detection signal from the INT terminal 106 and executes an interrupt handler that detects software locking the driver 122#n_1. A detection request of the software may be transmitted by broadcasting to the INT terminals 106#0 to 106#n, or may be transmitted to only the INT terminal 106#1 for the CPU 101#1 that makes the access.

If no response signal is returned to the CPU 101#1, the ACK output unit 204 transmits a dummy ACK signal to the CPU 101#1 to prevent the app 123_3 from terminating operation. In the case of the multi-core processor system 100 according to a conventional example, a countermeasure is taken according to which no ACK signal is returned; and the OS 121 detects a time out and causes the operation of the app 123_3 to abnormally come to an end. However, it may take several seconds for the OS 121 to detect the time out or the OS 121 may fail to detect the time out and stall. In the case of the multi-core processor system 100 according to the embodiment, abnormal termination of the operation of the app 123_3 can be prevented by transmitting the dummy ACK signal.

FIG. 6 is an explanatory diagram of an operation of the multi-core processor system 100 for restoration from an abnormal state. The multi-core processor system 100 in FIG. 6 is depicted in a state maintained after the ACK output unit 204 operates. The watchdog timer 102 receives the notification of the abnormal state in FIG. 5 and sends a warm start request to the CPU 101#n. The CPU 101#n receives the warm start request and is reset using software. The lock on the driver 122#n_1 is released and the access right for the shared device 105_1 is released.

The CPU 101#n receives a detection signal from the INT terminal 106#n, executes the interrupt handler that detects the software locking the driver 122#n_1, and detects the app 123_5. After the detection, the CPU 101#n forcibly causes the operation of the detected app 123_5 to come to an end.

The device control unit 205 resets the shared device 105_1 and thereafter, the writing unit 206 writes into the control register 109_1, the data written in the dummy register 107_1. These operations cause the multi-core processor system 100 to be restored from the abnormal state. The operation of the app 123_5 having the problem is forcibly caused to come to an end and the app 123_3 can continue processing normally.

FIG. 7 is an explanatory diagram of an example of the storage contents of the device response time period DBs 108. The device response time period DBs 108 each include two fields, including "device name" and "response time period". The device name field stores the name of the shared device 105. The device name field may store identification (ID) that can uniquely identify the shared device 105. The response time period field stores the response time period of the shared device 105.

For example, the device response time period DB 108_0 corresponding to the shared devices 105 whose priorities of the monitoring are intermediate stores the response time periods of the shared devices 105_0 and 105_1 as 400 and 500 [microseconds], respectively. The device response time period DB 108_1 corresponding to the shared device 105 whose priority of the monitoring is high stores the response time period of the shared device 105_2 as 10 [milliseconds]. The content of the response time period field may be changed freely by the user.

The device monitoring apparatus 103 executes the process for restoration from an abnormal state, using a function of the device monitoring apparatus 103 depicted in FIG. 2 and the storage contents of the device response time period DBs 108 depicted in FIG. 7. FIGS. 8 and 9 depict flowcharts for the device monitoring apparatus 103 to detect an abnormal state and continuously execute the restoration process.

In the flowcharts depicted in FIGS. 8 and 9, it is assumed that the app 123_5 stalls due to a write request for the shared device 105_1 from the app 123_5; and, thereafter, the app 123_3 issues a write request for the shared device 105_1. The app 123_5 and the driver 122#n_1 are executed by the CPU 101#n and the app 123_3 is executed by the CPU 101#1. The app 123_3 invokes the driver 122#1_1. However, in FIGS. 8 and 9, the processing of the driver 122#1_1 is same as that of the driver 122#*n*_1 and therefore, is not depicted and is described using the reference numerals of the processes of the driver 122#*n*_1.

FIG. 8 is a flowchart of the processes executed for detection of an abnormal state of the multi-core processor system 100. The app 123_5 opens the driver 122#*n*_1 (step S801). The opened driver 122#*n*_1 acquires the access right for the shared device 105_1 (step S802). The driver 122#*n*_1 executes saving and restoration with respect to the control register 109_1 (step S803).

Thereafter, the app 123_5 invokes the driver 122#*n*_1 and executes a write request of the control register 109_1 (step S804). The invoked driver 122#*n*_1 issues a write request to the control register 109_1 (step S805).

The device monitoring apparatus 103_0 receives the write request and using the setting unit 201_1, sets the start of the measurement by the timer 207 (step S806). The device monitoring apparatus 103_0 writes into the dummy register 107_1 and the control register 109_1, the data that is requested to be written (step S807).

After issuing the write request, the app 123_5 determines whether the app 123_5 detects an occurrence of an abnormality (step S808). If the app 123_5 detects the occurrence of an abnormality (step S808: YES), the app 123_5 determines whether software recovery is executable (step S809). If the app 123_5 determines that software recovery is executable (step S809: YES), the app 123_5 executes software recovery (step S810). If the app 123_5 determines that software recovery is not executable (step S809: NO), the app 123_5 enters an abnormal state (step S811) and the app 123_5 thereafter remains in a stalled state.

If the app 123_5 detects no occurrence of an abnormality (step S808: NO), the app 123_5 progresses to the process at step S804. If the result of the determination executed at step S808 is "step S808: NO", the shared device 105_1 sends an ACK signal and therefore, the timer 207 measurement set at step S806 stops. After the process at step S810 is executed, the app 123_5 also progresses to the process executed at step S804.

A case is assumed where, during the stalling of the app 123_5, the app 123_3 accesses the shared device 105_1. The app 123_3 opens the driver 122#1_1 (step S812). After the process at S812 is executed, the driver 122#1_1 is executed. The process of the driver 122#1_1 executed after the process at S812 is same as the process executed at steps S802 and S803. However, the app 123_5 has stalled retaining the access right for the shared device 105_1 and therefore, the app 123_3 can not acquire the access right for the shared device 105_1. Therefore, the driver 122#1_1 can not complete the saving and restoration with respect to the control register 109_1, i.e., the processes executed at step S803, and fails in the saving and restoration.

The app 123_3 invokes the driver 122#1_1 and executes a write request of the control register 109_1 (step S813). After the process at 5813 is executed, the driver 122#1_1 is executed and the process of the same content as that of the process executed at step S805 is executed.

The device monitoring apparatus 103_0 receives from the driver 122#1_1, the write request for the control register 109_1 and writes into the dummy register 107_1 (step S814). In the process executed at step S814, the app 123_3 does not have the access right for the shared device 105_1 and therefore, the write request is not reflected on the control register 109_1.

FIG. 9 is a flowchart of a process for restoration from an abnormal state of the multi-core processor system 100. The device monitoring apparatus 103_0 detects using the time gap detecting unit 202 that the access time period measured by the timer 207 exceeds the response time period, and detects this state as an abnormal state (step S901). After detecting the abnormal state, the device monitoring apparatus 103_0 outputs, using the ACK output unit 204, a dummy ACK signal to the CPU 101#1 (step S902). The CPU 101#1 receives the dummy ACK signal and normally executes the app 123_3 (step S903).

After detecting the abnormal state, the device monitoring apparatus 103_0 outputs, using the abnormality detecting unit 203, a detection signal to the watchdog timer 102 and the INT terminal 106 (step S904).

The CPU 101#*n* receives the detection signal from the INT terminal 106#*n* and forcibly causes the operation of the app 123_5 to come to an end (step S905). The driver 122#*n*_1 releases the access right for the shared device 105_1 due to the warm starting of the OS 121#*n* that using the watchdog timer 102, receives the detection signal (step S906).

The device monitoring apparatus 103_0 prohibits writing into the dummy register 107_1, using the abnormality detecting unit 203 (step S907). After prohibiting the writing, the device monitoring apparatus 103 instructs the shared device 105_1 to reset, using the device control unit 205 (step S908). After completing the resetting of the shared device 105_1, the device monitoring apparatus 103_0 writes the content of the dummy register 107_1 into the control register 109_1 using the writing unit 206 (step S909). After the writing, the device monitoring apparatus 103_0 releases the prohibition of the writing into the dummy register 107_1 (step S910).

In the flowcharts depicted in FIGS. 8 and 9, the app 123_5 having the problem stalls and thereafter, the app 123_3 having no problem accesses the shared device 105_1. Even when the app 123_5 having the problem stalls and thereafter, no app accesses the shared device 105_1, the multi-core processor system 100 can restore the abnormal state to a normal state. When no app accesses the shared device 105_1, the device monitoring apparatus 103_0 does not execute the processes at steps S814, S902, and S909.

As described, according to the access method and the multi-core processor system, when no response signal is returned and the predetermined time period elapses after the starting time of access from the CPU by the driver, the device monitoring apparatus determines that this state is an abnormal state of the shared device, and outputs a detection signal. Thereby, the multi-core processor system can detect the stalling of the driver caused by access of the shared device.

The device monitoring apparatus may refer to the memory storing the response time period that is a part of the specification of the shared device, for the predetermined time period. Thereby, the multi-core processor system can detect the abnormal state simultaneously with the operation of each of the shared devices whose response time periods are different from each other. The multi-core processor system may vary the predetermined time period based on an instruction from the user, etc.

When a response signal to the access is output from the shared device, the device monitoring apparatus stops the comparison of the predetermined time period and the access time period from the starting time of the access. Thereby, the multi-core processor system can be adapted to prevent detecting, as an abnormal state, a state where the shared device operates normally.

The device monitoring apparatus may have the storage area retaining the data that is written into the shared device from the CPU and, when an abnormal state is detected, may prohibit the storage area from retaining the data. Thereby, the multi-core processor system can protect the data that is not written into the shared device due to the occurrence of the abnormal state, from overwriting from and by another CPU, etc.

Even after the detection of the abnormality, the device monitoring apparatus may retain the data that is written into the storage area before the abnormal state is detected. Thereby, the multi-core processor system can retain the data that is not written into the control register of the shared device even after the abnormal state occurs.

After the driver is reset based on the detection signal, the device monitoring apparatus may write the data retained in the storage area into the control register of the shared device. Thereby, the multi-core processor system can be restored from the abnormal state and can cause the data generated by the app having no problem and different from the app that causes the abnormal state, to be written into the shared device.

The device monitoring apparatus may write the data retained in the storage area into the shared device and thereafter, may accept access of the shared device from another app executed by a CPU that is different from the CPU executing the app causing the abnormal state. Thereby, in the multi-core processor system, the other app does not stall and chain-reaction occurrences of stalls can be prevented.

According to the multi-core processor system according to a conventional example, the OS thereof detects a state where no response is returned from an app as an abnormal state. In this case, it takes several seconds to detect the state as an abnormal state and therefore, a problem arises in that a chain of stalls occurs and the convenience for the user is degraded. According to the multi-core processor system of the embodiment, an abnormal state can be detected in a short time, i.e., the response time period of the shared device and therefore, effects are achieved that the abnormal state can be detected before the chain of stalls occurs and that the occurrence of the abnormal state is difficult to be noticed by the user.

According to the multi-core processor system of a conventional example, when a chain of stalls occurs, the user may mistakenly recognize this state as a fault of the apparatus corresponding to the multi-core processor system. If the user mistakenly recognizes the state, a problem consequently arises in that a countermeasure needs to be taken by the design engineers, etc. against the fault. If the state is determined as the fault of the apparatus, the apparatus needs to be collected for checks on the fault and therefore, another problem arises in that the cost necessary for implementing a countermeasure increases. An abnormality due to software may occur when various conditions are simultaneously satisfied and therefore, yet another problem arises in that it is difficult to replicate the abnormal state.

However, according to the multi-core processor system of the embodiment, the operation of the app having the problem is forcibly caused to come to an end; the other apps are normally executed; and therefore, the user can easily determine that the app has the problem without mistakenly recognizing the abnormal state as the fault of the apparatus. Thereby, when a report on the fault is issued, the apparatus does not need to be collected and the developer can cope with the state by executing re-distribution of the app having the problem. Therefore, the multi-core processor system of the embodiment can reduce the cost necessary for coping with the abnormal state.

The device monitoring apparatus 103 described in the present embodiment can be realized by an application specific integrated circuit (ASIC) such as a standard cell or a structured ASIC, or a programmable logic device (PLD) such as a field-programmable gate array (FPGA). Specifically, for example, functional units (the setting unit 201 to the timer 207) of the device monitoring apparatus 103 are defined in hardware description language (HDL), which is logically synthesized and applied to the ASIC, the PLD, etc., thereby enabling manufacture of the device monitoring apparatus 103.

According to the access method and the multi-core processor system, an effect is achieved that a stalling of an app caused by access of a shared device can be detected.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An access method executed by a multi-core processor system, the access method comprising:
    activating a driver that corresponds to a first central processing unit (CPU), based on a start of execution of a first application;
    starting measurement of an access time period, based on access of a peripheral device;
    outputting, when the access time period exceeds a predetermined time period, a detection signal to reset the driver; and
    prohibiting, when the access time period exceeds a predetermined time period, writing into a register retaining data to be written into the peripheral device from the first CPU.

2. The access method according to claim 1, comprising referring to the predetermined time period from memory storing a response time period of the peripheral device.

3. The access method according to claim 1, comprising terminating comparison of the predetermined time period and the access time period when a response signal to the access is output from the peripheral device.

4. The access method according to claim 1, comprising causing the register to retain data that is written into the register before the writing is prohibited.

5. The access method according to claim 1, comprising writing into the peripheral device, data retained by the register after the driver is reset based on the detection signal.

6. The access method according to claim 5, comprising accessing, by a second application executed by a second CPU, the peripheral device after the writing of the data retained by the register into the peripheral device.

7. A multi-core processor system comprising:
    a first CPU that executes a first application; and
    a peripheral device that is accessed by the first application, wherein
    the peripheral device is connected to a virtual register that includes a timer, a first detecting circuit, a second detecting circuit, and a register,
    the timer responds to the access and measures an access time period,
    the first detecting circuit compares the access time period and a predetermined time period, and
    the second detecting circuit, when the access time period exceeds the predetermined time period, outputs a detection signal and with respect to data to be written from the first CPU into the peripheral device, stops a writing of the data into the register.

8. The multi-core processor system according to claim 7, wherein a driver that corresponds to the first CPU is reset based on the detection signal.

9. The multi-core processor system according to claim 8, wherein the data written into the register is written into the peripheral device.

* * * * *